United States Patent [19]

Hoge

[11] Patent Number: 5,247,540
[45] Date of Patent: Sep. 21, 1993

[54] REVERSIBLE DATA LINK

[76] Inventor: Jay Hoge, 338 N. Tannery Rd., Westminster, Md. 21157

[21] Appl. No.: 596,712

[22] Filed: Oct. 10, 1990

[51] Int. Cl.$^5$ .............................................. H04B 1/44
[52] U.S. Cl. ........................................ 375/7; 370/32; 307/242
[58] Field of Search ................. 375/121, 7, 8; 370/24, 370/25, 32, 28, 79, 85.1, 99, 85.7, 85.11, 85.13, 85.14, 85.15, 95.1, 42; 330/124 R; 328/103; 307/239-244

[56] References Cited

U.S. PATENT DOCUMENTS

| | | | |
|---|---|---|---|
| 4,481,660 | 11/1984 | de Koning et al. | 330/124 R |
| 4,661,966 | 4/1987 | Schreiner | 375/112 |
| 4,893,305 | 1/1990 | Fernandez et al. | 375/8 |
| 4,900,660 | 12/1990 | Nakamura et al. | 370/32 X |
| 4,943,978 | 7/1990 | Rice | 370/99 X |

*Primary Examiner*—Curtis Kuntz
*Assistant Examiner*—Young Tse
*Attorney, Agent, or Firm*—Longacre & White

[57] ABSTRACT

A device is capable of electronically reversing the polarity of a polarized data link interface used between a data termination equipment (DTE) and either a data communication equipment (DCE) or another data termination equipment (DTE). In this manner, the establishment of physical level connectivity in the data link interface is simplified and the interfacing of DTEs (such as computers) and peripheral devices is improved.

3 Claims, 3 Drawing Sheets

REVERSIBLE DATA LINK

FIELD OF THE INVENTION

This invention relates to the interfacing of computers to peripheral devices and is specifically directed toward electronically reversing the polarity of a polarized data link interface, thus simplifying the physical connections linking computers to peripheral devices.

BACKGROUND OF THE INVENTION

The interfacing of computers to peripheral devices demands that standard protocols for data transfer be established as a precondition to the easy integration of computing systems. Protocols must exist on two (2) levels: the physical and the logical. The physical level consists of the establishment of standards for the passing of electrical signals between the two devices. The logical level consists of the interpretation of the data embodied in these signals. This invention deals with the physical level.

The E.I.A. RS232 standard was originally promulgated in the early 1960's to deal with this physical data link. It established two classes of equipment; Data Termination Equipment (DTE) and Data Communications Equipment (DCE). The RS232 standard dealt with the data link between a DTE (usually either a computer or a teletype) and a DCE (usually a modem). It defined a logically bidirectional interface using mirror imaged transmit/receive pairs to transfer data in either direction. The standard defined a polarized connection utilizing twenty-five (25) conductor cable, terminated with "D subminiature" connectors. Signal levels were defined, as were minimum rise times for signals, and other electrical parameters. This standard, with its subsequent revisions, defined the physical level standard for serial communications which has become the "Lingua Franca" of data communications.

Since the establishment of the RS232 standard, numerous new classes of peripheral equipment have appeared, the polarity of which with respect to the DTE/DCE distinction is sometimes unclear. An example is the case of a personal computer with an RS232 port. Generally, these ports are configured as DTE's, in order to facilitate the connection to a modem. Occasions arise where a connection to another DTE (for example, a terminal) is desired. To accomplish this interface with current equipment, a new cable must be fabricated to "reverse" the polarity of the signals.

FIG. 1 reveals a conventional connection between a DTE and a DCE. Specifically, the diagram shows the devices labeled DCE and DTE with a simplified two signal wire connection between them. In order for data transfer to take place the transmitting port 1 of the DTE must be connected to the receiving port 2 of the DCE and vice versa. Thus, the ports of the two devices must be mirror imaged. If this is not the case (such as when a DTE is connected with another DTE), the prior art requires that a special cable be constructed which reverses the signals. The wire connection, transmitting and receiving ports together comprise a data link between the DCE and the DTE.

SUMMARY OF THE INVENTION

It is an object of the invention to simplify the establishment of physical level connectivity in a data link by providing a circuit capable of electronically reversing the polarity of a connection in the data link.

It is another object of the invention to improve the interfacing of computers and peripheral devices.

The present invention provides a device which is capable of reversing the polarity of a polarized data link interface between DTE and DCE and alleviates the need for additional data links.

DETAILED DESCRIPTION OF THE DRAWINGS

Figure 1:
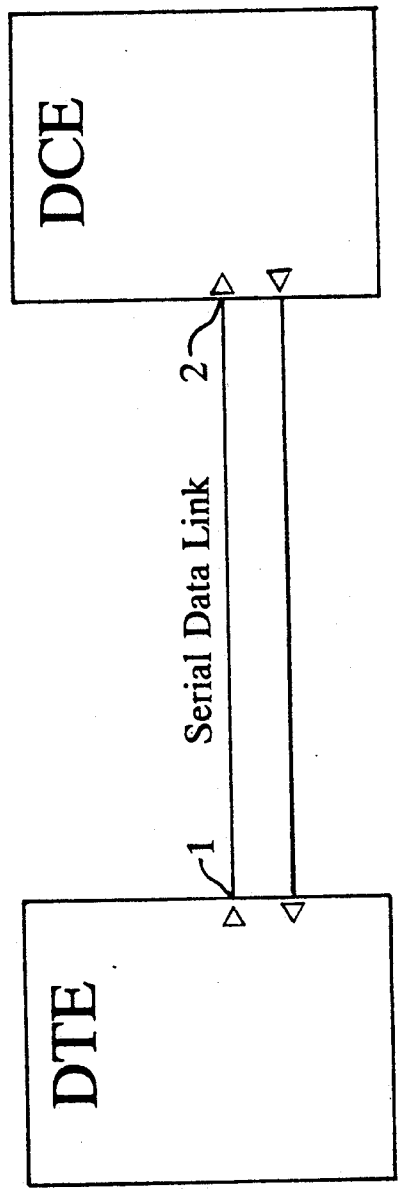
FIG. 1 shows a prior art serial data link between DCE and DTE.
Figure 2:
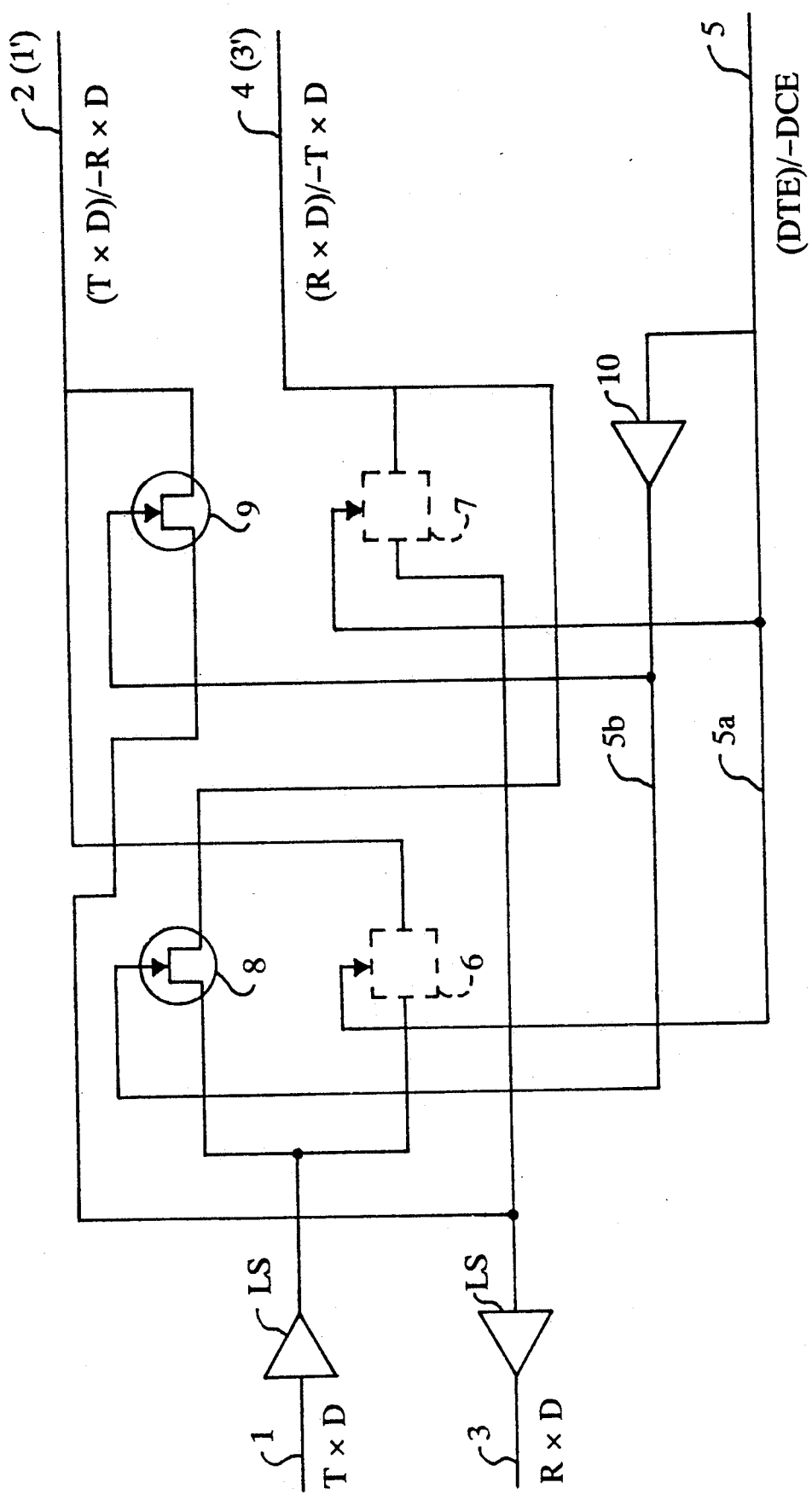
FIG. 2 shows a schematic diagram of the device according to the present invention.

FIG. 2 shows a schematic of the device for reversing the signals of a two wire interface such as shown in FIG. 1. Although the device shown in FIG. 2 is described in detail hereinafter as reversing a transmit data signal and a receive data signal for a DTE, it will be understood that it is not limited to such a function and may be used to reverse the paths of any two electrical signals. Other examples of signals which may be reversed by the device of FIG. 2 will be described in conjunction with FIG. 3.

In order to transfer data from a DTE to a DCE with the device of FIG. 2, a terminal 5 of the device connected to an electrical line 5a is continuously provided with a high level (e.g. 5 Volts) control signal (DTE)/-DCE. The high level control signal in the electrical line 5a thus actuates a pair of electrical switches 6 and 7 to cause them to assume their closed positions. Electrical switches 8 and 9, on the other hand, receive a low level control signal from an electrical line 5b so that they remain in their open positions. (The signal level of the control signal (DTE)/-DCE is inverted at an inverter 10 before entering the electrical line 5b. This ensures that the signal levels in the electrical lines 5a and 5b will always be opposite to each other.) Thus, in this configuration, a signal TxD from the transmitting port 1 of the DTE travels through a level shifter LS (e.g. to change the voltage of the signal from 5 Volts to 12 Volts bipolar), across the closed electrical switch 6, and to the receiving port 2 of the DCE. Similarly, a signal -TxD from the transmitting port 4 of the DCE travels across the closed electrical switch 7, through a level shifter LS (e.g. to change the voltage of the signal from 12 Volts bipolar to 5 Volts), and to the receiving port 3 of the DTE.

If, on the other hand, it is desired to connect a first DTE with a second DTE, then a low level (e.g. 0 Volts) control signal (DTE)/-DCE is continuously supplied to the terminal 5. This causes the electrical switches 6, 7 to open because of the low signal level now present in the electrical line 5a. Furthermore, because a high signal level is now present in the electrical line 5b (due to the electrical action of the inverter 10), the electrical switches 8, 9 are now caused to assume their closed positions. Thus, in this configuration, a signal TxD from the transmitting port 1 of the first DTE now travels through the level shifter LS, across the closed electrical switch 8, and to the receiving port 3' (indicated in parentheses in the Figure) of the second DTE. Similarly, a signal TxD (indicated in parentheses in the Figure)

from the transmitting port 1' (again indicated in parentheses) of the second DTE travels across the closed electrical switch 9, through the level shifter LS, and to the receiving port 3 of the first DTE.

The level of the control signal (DTE)/-DCE may either be selected manually by a system designer or, alternately, could be automatically selected by the computer itself or an embedded microprocessor. For example, the computer could initially attempt (via the control signal) to set up the data link in one configuration and, if no successful data communication is established in the one configuration, then the computer could automatically switch (via the control signal) to the other configuration. In this manner reconfiguration may be accomplished without requiring that a manual switch or jumper be set.

The two wire interface in FIG. 2 is shown by way of example only. The device shown could simply be multiplied to encompass as many signal paths as necessary. A RS232 in practice, may have as few as two or as many as twenty-five signal paths.

Figure 3:
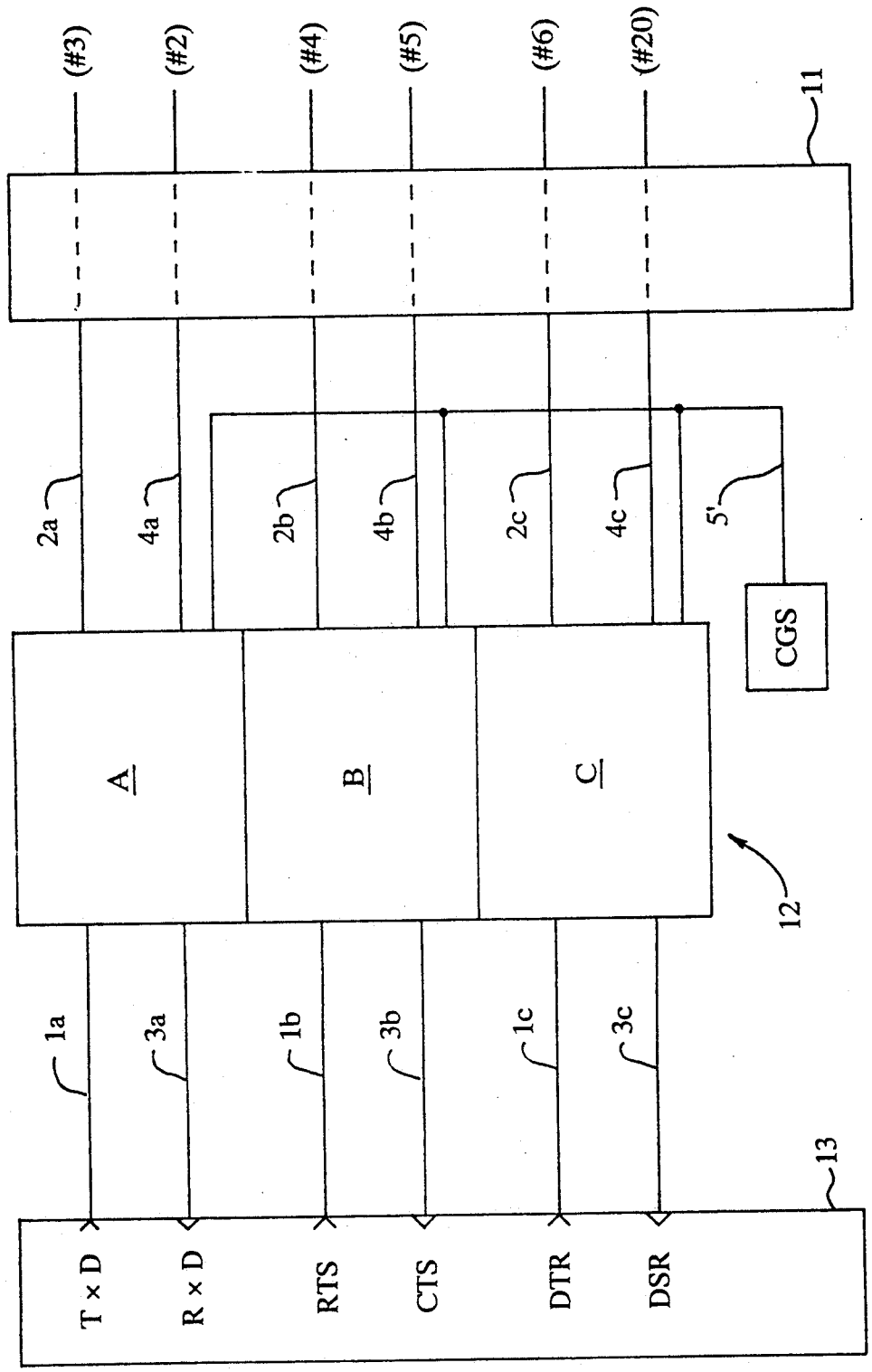
FIG. 3 shows an electronic coupler employing three of the devices shown in FIG. 2.

FIG. 3 schematically represents an RS232 port as configured on IBM compatible personal computers which has been provided with data links according to the invention. A conventional 25 pin connector 11 is provided on the personal computer (i.e. a DTE) and is adapted to be connected to a conventional cable leading to a peripheral device (e.g. a DTE or a DCE).

Three reversible data links, labelled A, B, and C, are provided within an electronic coupler 12. Each of the data links is a device constructed according to the schematic diagram shown in FIG. 2. The data links A, B, and C have inputs 1a, 1b, 1c, 3a, 3b, 3c, and 5' and outputs 2a, 2b, 2c, 4a, 4b, and 4c. Other than the input 5', each of the inputs and outputs of the data links A, B, and C is denoted by a reference numeral (i.e. 1, 2, 3, or 4) followed by a distinguishing letter (i.e. a, b, or c) and corresponds to the input or output of the data link shown in FIG. 2 which bears its reference numeral. The input 5' is applied to all three of the data links A, B, and C simultaneously and, for each of the data links, corresponds to the input 5 shown in FIG. 2.

The inputs 1a, 1b, 1c, 3a, 3b, and 3c are connected to a conventional universal receiver transmitter 13 internal to the computer. Specifically, the input 1a is connected to the transmit data line TxD of the computer, the input 2a is connected to the receive data line RxD of the computer, the input 1b is connected to the request to send signal line RTS of the computer, the input 2b is connected to the clear to send signal line CTS of the computer, the input 3a is connected to the data terminal ready signal line DTR of the computer, and the input 3b is connected to the data set ready signal line DSR of the computer. Finally, the input 5' is connected to a suitable control signal generator CGS which may comprise either a manually or automatically operable switch for controlling the amplitude or voltage of a control signal provided at (e.g. applied to) the input 5'.

The outputs 2a, 2b, 2c, 4a, 4b, and 4c are connected to the pin connector 11. Specifically, output 2a is connected to pin #3 of the connector, output 4a is connected to pin #2 of the output 4b is connected to pin #5 of the connector, output 2c is connected to pin #6 of the connector, and output 4c is connected to pin #20 of the connector.

The operation of the electronic coupler 12 is as follows. When the personal computer is connected with a peripheral device such as a modem (DCE), a control signal having a first magnitude or voltage is generated by the CGS and provided at the input 5'. The control signal 5' is applied (both directly and in an inverted fashion as shown in FIG. 2) to each of the reversible data links A, B, and C. This causes the electronic switches 6, 7 (as shown in FIG. 2) in each of the reversible data links to close and connect each of the inputs 1a, 1b, 1c, 3a, 3b, and 3c with the respective output 2a, 2b, 2c, 4a, 4b, and 4c. In this arrangement, pin #2 of the connector 11 is used to receive data (RxD) from the peripheral device while pin #3 is used to transmit data (TxD) thereto. Similarly, pin #4 is used to transmit a request to send signal RTS to the peripheral device while pin #5 is used to receive a clear to send signal CTS therefrom. Pin #6 is used to send a data terminal ready signal DTR to the peripheral device while pin #20 is used to receive a data set ready signal DSR therefrom.

Alternately, when the personal computer is connected to a peripheral device such as another personal computer (DTE), a control signal, generated by the CGS and having a second magnitude or voltage, is applied to the input 5'. This causes the electronic switches 8, 9 in each of the reversible data links A, B, and C to close and connect each of the inputs 1a, 1b, 1c, 3a, 3b, and 3c with the respective output 4a, 4b, 4c, 2a, 2b, and 2c. In this alternate arrangement, pin #3 of the connector 11 is used to receive data (RxD) from the peripheral device while pin #2 is used to transmit data (TxD) thereto. Similarly, pin #5 is used to transmit a request to send signal RTS to the peripheral device while pin #4 is used to receive a clear to send signal CTS therefrom. Pin #20 is used to send a data terminal ready signal DTR to the peripheral device while pin #6 is used to receive a data set ready signal DSR therefrom. Thus, the reversible data links A, B, and C (which are each functionally identical to the reversible data link shown in FIG. 2) are operative to provide an adaptive RS232 interface wherein the functions of selected individual pin connections in the pin connector 11 of the interface may be switched so as to accommodate interfacing either with a DCE (such as a modem) or another DTE (such as another personal computer.

Advantageously, a portion of the electronic coupler 12 comprising the data links A, B, and C, is implemented as a monolithic integrated circuit which may be incorporated as a part of a DTE or a DCE. The monolithic I.C. advantageously employs either bipolar or MOSFET (metal oxide semiconductor field effect transistor) switching elements for performing the function of the electrical switches 6 to 9 shown in FIG. 2.

Although the pin connector 11 has been disclosed as a 25 pin connector, it is within the scope of the invention to employ a pin connector of a different variety, e.g. a nine pin connector.

Although the present invention has been described in conjunction with electrically actuated switches, it will be apparent to those skilled in the art that, for example, tri-state logic gates could also be used to perform the function of the switches. Moreover, although the present invention has been described with respect to the RS232 standard, it would be equally feasible to incorporate the present invention in devices other than those described herein. In such an event, it might be desirable to replace the voltage shifters LS with current amplifiers (or like devices), depending on the requirements of the particular application.

Although the invention has been described with certain particularity, it is not meant to be limited to the described embodiment, but it will also encompass any modifications which will fall within the scope of the appended claims.

I claim:

1. An electrical device for connecting two pieces of digital electronic equipment which may be relatively similar or relatively dissimilar, the electrical device comprising:

a receiving electrical port, a transmitting electrical port, a first reversible electrical port, and a second reversible electrical port;

a control port;

first means responsive to an electrical signal of a first signal level being provided at the control port for establishing both an electrical communication link between the receiving and first reversible electrical ports as well as an electrical communication link between the transmitting and second reversible electrical ports; and second means responsive to an electrical signal of a second signal level being provided at the control port for establishing both an electrical communication link between the receiving and second reversible electrical ports as well as an electrical communication link between the transmitting and first reversible electrical ports;

whereby, either the first signal level or the second signal level is generated based upon relative similarity between the digital electronic equipment connected to the receiving, transmitting, first reversible and second reversible electrical ports;

wherein each of the established electrical communication links between the respective electrical ports comprises a logical level shifter means therein for shifting the voltage or amplitude of a signal which is transmitted through said each electrical communication link from a first logical level to a second logical level.

2. An electrical device comprising:

an input electrical port, an output electrical port, a first reversible electrical port, and a second reversible electrical port;

a control port;

first means responsive to an electrical signal of a first signal level being provided at the control port for establishing both an electrical communication link between the input and first reversible electrical ports and an electrical communication link between the output and second reversible electrical ports; and second means responsive to an electrical signal of a second signal level being provided at the control port for establishing both an electrical communication link between the input and second reversible electrical ports and an electrical communication link between the output and first reversible electrical ports;

whereby, either the first signal level or the second signal level is generated based upon relative similarity between equipment connected to the input, output, first reversible and second reversible electrical ports;

wherein each of the established electrical communication links between the respective electrical ports comprises a logical level shifter means therein for shifting the voltage or amplitude of a signal which is transmitted through said each electrical communication link from a first logical level to a second logical level.

3. An electrical device for connecting two pieces of digital electronic equipment which may be relatively similar or relatively dissimilar, the electrical device comprising:

a receiving electrical port, a transmitting electrical port, a first reversible electrical port, and a second reversible electrical port;

a control port;

first means responsive to an electrical signal of a first signal level being provided at the control port for establishing both an electrical communication link between the receiving and first reversible electrical ports as well as an electrical communication link between the transmitting and second reversible electrical ports; and second means responsive to an electrical signal of a second signal level being provided at the control pot for establishing both an electrical communication link between the receiving and second reversible electrical ports as well as an electrical communication link between the transmitting and first reversible electrical ports;

whereby, either the first signal level or the second signal level is generated based upon relative similarity between the digital electronic equipment connected to the receiving, transmitting, first reversible and second reversible electrical ports;

wherein the electrical device is implemented as a monolithic integrated circuit.

* * * * *

REEXAMINATION CERTIFICATE (2748th)
United States Patent [19]
Hoge

[11] B1 5,247,540
[45] Certificate Issued Dec. 5, 1995

[54] REVERSIBLE DATA LINK

[75] Inventor: Jay Hoge, Westminster, Md.

[73] Assignee: Longacre & White, Arlington, Va.

Reexamination Request:
No. 90/003,534, Aug. 18, 1994

Reexamination Certificate for:
Patent No.: 5,247,540
Issued: Sep. 21, 1993
Appl. No.: 596,712
Filed: Oct. 10, 1990

[51] Int. Cl.$^6$ .................................................. H04B 1/44
[52] U.S. Cl. ....................... 375/220; 375/377; 370/32; 307/115; 327/403; 340/825
[58] Field of Search .................... 375/220, 222, 375/377; 370/24–25, 28, 32, 42, 79, 85.1, 85.9, 85.11, 85.13–85.15, 95.1, 99; 328/103; 307/112, 239–244; 379/93–98, 226–227

[56] References Cited

U.S. PATENT DOCUMENTS 4,782,498  11/1988  Copeland, III ........................ 375/8
5,003,581  3/1991   Pittard ................................. 379/93
5,040,172  8/1991   Mano et al. ........................ 370/85.11
5,194,758  3/1993   Ver Meer ........................... 375/121

OTHER PUBLICATIONS

Ralph L. Adcock, "Circuit ensures proper RS–232C mating", *EDN Design Ideas Special Issue*, 25 Jun. 1987, p. 18.
Noor Singh Khalsa, "Monitor RS–422 Lines and Convert to RS–232", *Electronic Design*, 27 Apr. 1989, p. 108.
Murdock et al., "Build a Direction–Sensing Bidirectional Repeater", *Electronic Design*, 11 May 1989, pp. 105–110.
"RS–232C to RS–485 converters control bus direction automatically", *EDN*, 23 Jul. 1987, p. 103.
"A1000 and A2000 Series RS–232/RS–485 Converters and RS–485 Repeaters", DGH Corp. technical brochure.

*Primary Examiner*—Young Tse

[57] ABSTRACT

A device is capable of electronically reversing the polarity of a polarized data link interface used between a data termination equipment (DTE) and either a data communication equipment (DCE) or another data termination equipment (DTE). In this manner, the establishment of physical level connectivity in the data link interface is simplified and the interfacing of DTEs (such as computers) and peripheral devices is improved.

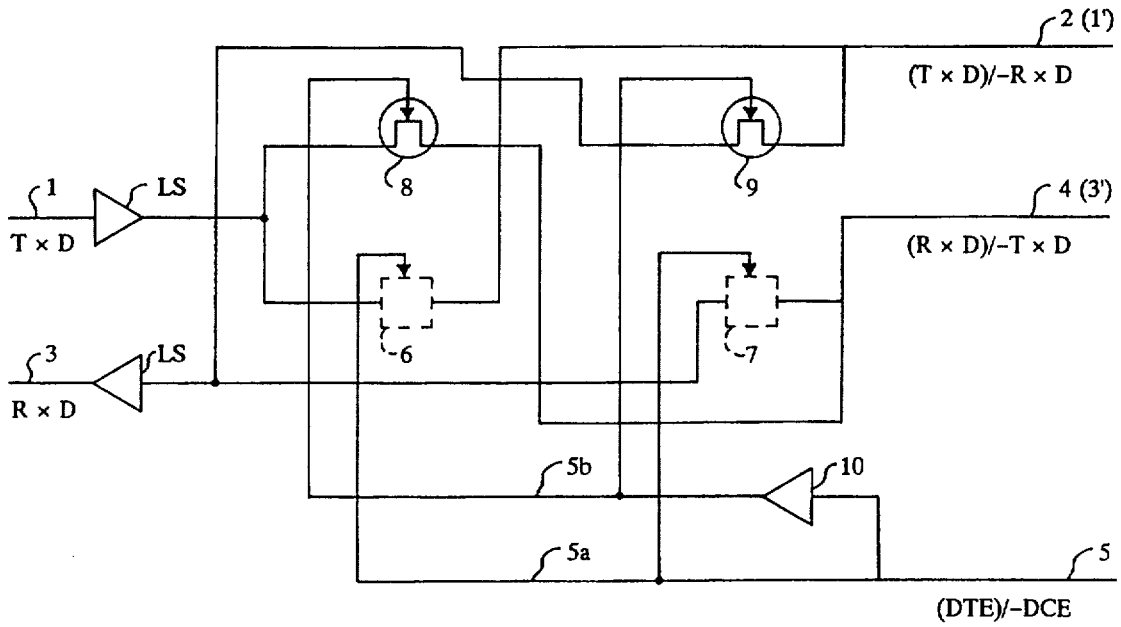

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claims 4–11 are added and determined to be patentable.

*4. An electrical device for connecting a first piece of data termination equipment to a first reversible port and a second reversible port, the first piece of data termination equipment including a receiving electrical port and a transmitting electrical port, said electrical device comprising:*

*a) first switch means for electrically connecting the transmitting electrical port to the first reversible port;*

*b) second switch means for electrically connecting the transmitting electrical port to the second reversible port;*

*c) third switch means for electrically connecting the receiving electrical port to the first reversible port;*

*d) fourth switch means for electrically connecting the receiving electrical port to the second reversible port; and*

*e) control signal means for actuating one of:*
    *i) said first as well as fourth switch means in response to a first control signal level, and*
    *ii) said second as well as third switch means in response to a second control signal level,*

*5. The electrical device according to claim 4, wherein the first piece of data termination equipment selects either said first and fourth or said second and third switch means actuated by said control signal means based on establishing a successful data link with said first and second reversible electrical ports.*

*6. The electrical device according to claim 5, wherein said first piece of data termination equipment initially selects said first and fourth switch means seeking to establish said successful data link.*

*7. The electrical device according to claim 6, wherein said first piece of data termination equipment subsequently selects said second and third switch means to establish said successful data link.*

*8. The electrical device according to claim 4, wherein a manual switch selects either said first and fourth or said second and third switch means actuated by said control signal means.*

*9. The electrical device according to claim 4, wherein said first and second reversible electrical ports access a second piece of data termination equipment.*

*10. The electrical device according to claim 4, wherein said first and second reversible electrical ports access a piece of data communication equipment.*

*11. An electrical device for connecting a first piece of data termination equipment with a component which may be either a second piece of data termination equipment or a piece of data communication equipment, said electrical device comprising:*

*a receiving electrical port, a transmitting electrical port, a first reversible port, and a second reversible port;*

*a control port;*

*first means responsive to an electrical signal of a first signal level being provided by said first piece of data termination equipment at the control port for establishing both an electrical communication link between the receiving and first reversible electrical ports as well as an electrical communication link between the transmitting and second reversible electrical ports;*

*second means responsive to an electrical signal of a second signal level being provided by said first piece of data termination equipment at the control port for establishing both an electrical communication link between the receiving and second reversible electrical ports as well as an electrical communication link between the transmitting and first reversible electrical ports;*

*whereby, one of said first and second signal levels is generated by said first piece of data termination equipment solely responsive to whether the component is the second piece of data termination equipment or the piece of data communication equipment;*

*wherein each of the established electrical communication links between the respective electrical ports comprises a logical level shifter means therein for shifting the voltage or amplitude of a signal which is transmitted through said each electrical communication link from a first logical level to a second logical level, and*

*wherein the electrical device is implemented as a monolithic integrated circuit.*

* * * * *